United States Patent [19]

Peck

[11] 4,428,459
[45] Jan. 31, 1984

[54] TREE STAND

[75] Inventor: Paul L. Peck, Fond du Lac, Wis.

[73] Assignee: Total Shooting Systems, Inc., North Fond du Lac, Wis.

[21] Appl. No.: 439,763

[22] Filed: Nov. 8, 1982

[51] Int. Cl.³ .......................... A47C 9/10; A45F 3/26; A01M 31/02
[52] U.S. Cl. .................................... 182/187; 182/134; 248/218.4
[58] Field of Search ............... 182/187, 188, 134, 135; 248/218.4; 108/152

[56] References Cited

U.S. PATENT DOCUMENTS

| | | | |
|---|---|---|---|
| 3,749,200 | 7/1973 | Meyer | 182/187 |
| 3,955,645 | 5/1976 | Dye | 182/187 |
| 4,022,292 | 5/1977 | Gompel | 182/187 |
| 4,134,474 | 1/1979 | Stavenau | 182/187 |
| 4,244,445 | 1/1981 | Strode | 182/187 |
| 4,321,983 | 3/1982 | Nelson | 182/135 |

Primary Examiner—Reinaldo P. Machado
Attorney, Agent, or Firm—Bayard H. Michael

[57] ABSTRACT

The notch in the back of the tree stand fits over a tree trunk and the flexible steel band encircles the trunk and supports the platform. Each side of the platform is provided with a pair of legs each of which is connected to the platform by pivots arranged at 90° to each other to let the legs be raised or lowered and to let the legs move inwardly. Each front leg carries a guide for the flexible steel band and also carries a locking device actuated by a knob. The device has a lock pin engageable with the band in any position of the legs and also has a pin engageable with the rear leg only in the raised (operative) position of the legs. The rear leg includes a flexible steel portion which can twist to accommodate misalignment at the connection between the legs.

14 Claims, 5 Drawing Figures

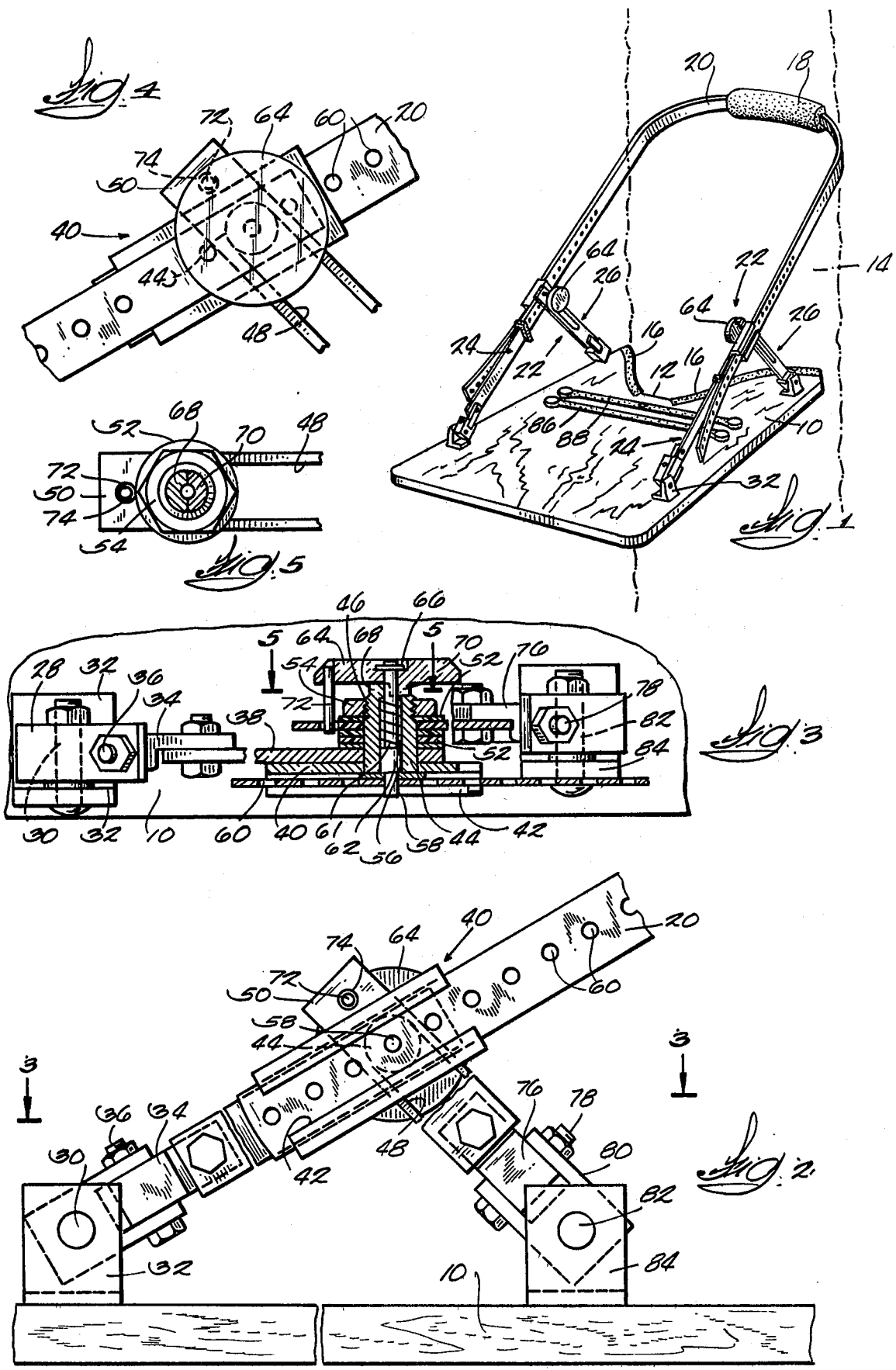

TREE STAND

BACKGROUND OF THE INVENTION

Tree stands are platforms which can be raised into position by the user while climbing the tree. When the user puts weight onto the platform it will grip the tree and enable the user to either use the stand at that elevation or grip the tree and raise the platform by flexing the knees. Tentler application Ser. No. 226,629, filed Jan. 21, 1981, provides a stand which grips a wide range of tree sizes, is quiet in use and does not harm trees. Use demonstrated that simpler adjustment of the band encircling the tree would be helpful, and anything which would add to stability would be desirable.

SUMMARY OF THE INVENTION

The principal object of this invention is to simplify use of tree stands and to increase the stability of the stand by increasing the grip on the tree.

This object is accomplished by providing a simple mechanism for adjusting the band encircling the tree and for locking the band support arms in the desired attitude to hold the band at the desired angle relative to the platform. A single knob can be manipulated to fix the band support legs in operating position and to fix the adjusted length of the band. The legs are pivoted on the platform for movement between a raised (use) position and a position in which they are collapsed against the platform. The legs are also pivoted for transverse movement. This allows the legs to lean in when the band encircles a thin tree... and this increases the grip on the tree. The transverse movement capability also avoids unusual stress on the mechanism.

BRIEF DESCRIPTION OF THE DRAWINGS

FIG. 1 is a perspective view of the operative position of the parts with a tree shown in phantom.

FIG. 2 is a side elevation with some portions of the legs removed.

FIG. 3 is a section taken on the meandering line 3—3 in FIG. 2.

FIG. 4 is an elevation of the intersection of the legs from the side opposite the FIG. 2 view.

FIG. 5 is a section on line 5—5 in FIG. 3.

DETAILED DESCRIPTION OF THE DRAWINGS

The tree stand comprises a generally rectangular plywood platform 10 having a notch 12 on the back edge to receive a tree trunk 14. The notch is lined with rubber 16 to prevent injury to the tree and to grip the trunk firmly when the platform is loaded. The "back" of the tree trunk is gripped by the rubber liner 18 carried on the flexible metal band 20 which is adjustably fixed to and carried by the supports 22 on each side of the platform.

Each support 22 includes a front leg 24 and a rear leg 26. Each leg is pivotally connected to the platform for movement about an axis running across the platform and can also pivot about an axis at 90° to the first axis so each leg can be raised and lowered relative to the platform and can swing inwardly of the platform as required. Thus, each front leg 24 has a U-shaped bracket 28 pivoted on pin 30 carried by mounting bracket 32 fixed on the platform. A connector 34 is pivoted on shaft 36 extending between the legs of the U bracket 28. A flate bar 38 is bolted to connector 34 and has a band guide 40 fixed on the end of the bar. The band guide has longitudinal edges 42 bent back on the guide to form longitudinal slots receiving and capturing flexible band 20.

A cylindrical body 44 is fixed in the guide 40 and in the end of bar 38 with a threaded end 46 projecting through the slot 48 in the spring steel portion 50 of leg 26. Delrin (or other plastic) washers 52 fit over the threaded end 46 on each side of the spring steel 50 and lock nut 54 completes the assembly allowing the interconnected ends of the legs 24, 26 to move relative to each other within the range of the slot 48.

A plunger 56 is slidably mounted inside the body 44. One end 58 of the plunger can project through one of the spaced holes 60 in the steel band 20 to adjustably fix the band. The plunger 56 is biased into engagement with the band by a spring 62 compressed between the shoulder on the pin 56 and the end of the cavity in which the spring is mounted. The other end of the plunger projects through the body and a central opening in knob 64 and has an E clip 66 fixed thereon to limit movement under influence of the spring. The body has a half collar 68 against which the underside of the knob rests when the tip 58 of the pin engages the hole 60 in the band. The underside of the knob 64 is provided with a depending half collar 70 which is complimentary to collar 68 and fits into the space not occupied by collar 68. The knob can be pulled out to disengage pin tip 58 from the band for adjusting purposes. The knob can be pulled out and then turned, say 90°, so collar 70 will rest on collar 68 and the knob is held in the "out" position.

The rim of the knob 64 has a pin 72 fixed therein and depending therefrom to engage a hole 74 in the end of leg 26 to lock the legs together in their operative position. Pin 72 is disengaged from hole 74 by pulling the knob outwardly ... which also disengages the band. When the legs are in the "in use" position the band and the legs have to be locked ... neither can be locked without the other. When the legs are collapsed against the platform, the band can be engaged by the pin to lock the band and permit the tree stand to be carried "over the shoulder" with the band over the shoulder and the rest hanging at the person's side.

The back leg 26 includes the steel part 50 which is bolted to connector 76 pivoted on bolt 78 between the legs of the U bracket 80 pivoted on shaft 82 in mount 84 fixed on the platform. As noted, both legs can be pivoted up and down and sideways. The sideways movement permits the legs to move inwardly to enable the band to grip a small tree trunk with the band 20 having an in-line attitude to the tree from the front bracket 32. This will increase the angular engagement of the band with the tree. It is obvious, however, that if both legs lean in and are interconnected there will be severe strains places on the parts ... and it is for this reason spring steel 50 is used in leg 26; it can twist to accomodate the "misalignment" and prevent undue strain on the other parts.

The stand is placed in use by pulling the knob out to disengage the lock pins 56, 72 so the band 20 can be passed around the tree trunk and adjusted and the legs erected. Then the knob is returned to its operative position in which the band is locked and the legs 24, 26 are locked. Now, the user puts his feet under the rubber straps 87, 88 fixed on the platform. The user then hoists himself up the trunk a distance to raise the platform. When he "steps down" the platform grips the tree and he can stand on it in preparation for the next "hoisting" action.

I claim:

1. A tree stand having a platform provided with a notch therein adapted to receive a tree trunk,
a flexible metal band adapted to embrace the tree trunk,
support means on each side of the platform for adjustably engaging the band and fixing the band at an angle relative to the platform whereby the band engages the tree in back of and above the platform, said support means being connected to the platform by pivot means allowing the support means to move sideways relative to the platform.

2. A tree stand according to claims 1 in which each of said support means includes a pair of legs each of which is pivotally connected to the platform for movement between raised and lowered positions in addition to said sideways movement,
said legs being slidably interconnected for movement between said raised position and said lowered position,
and means for fixing said legs in said raised position.

3. A tree stand according to claim 2 in which the means for fixing the legs in raised position and the means engaging the band have a common operator.

4. A tree stand according to claim 3 in which the legs pivotally connected to the front of the platform include a guide through which the band passes,
said band having a series of holes therethrough,
and said engaging means comprises a spring loaded pin biased into engagement with a hole in said band.

5. A tree stand according to claim 4 and in which the means for fixing the legs in raised position comprises a second pin engageable with a hole in the leg connected to the rear of the platform, and both of said pins are operated by said common operator.

6. A tree stand according to claim 5 including means for disabling said engaging means and said fixing means.

7. A tree stand according to claim 2 in which one leg of each pair of legs is flexible spring steel.

8. A tree stand having a platform the back side of which is provided with a notch adapted to receive a tree trunk,
a pair of arms mounted on each side of the platform, each arm being pivotally connected to the platform for movement about an axis generally normal to the side of the platform from a collapsed position to a raised position, the free ends of each pair being slidably interconnected,
one arm of each pair having a guide,
a flexible metal band adapted to embrace a tree trunk and adjustably received in said guides,
a plurality of spaced holes in said band,
a latch pin carried by one of the arms and engageable with any of the holes in said band,
a spring biasing said latch pin into engagement with said holes,
manual means for actuating said pin to a disengaged position against the bias of the spring.

9. A tree stand according to claim 8 including a second latch pin actuated by said manual means for engagement with and disengagement from the other arm to hold the arms in raised position or permit collapse of the arms.

10. A tree stand according to claim 9 in which the first latch pin is engageable with the band in any position of said arms and the second latch pin is engageable with said other arm only in the raised position of the arms.

11. A tree stand according to claim 10 including means retaining said manual means in a position in which both latch pins are inoperative.

12. A tree stand according to claim 11 in which the arm which carries the guide is the same arm which carries said first latch pin.

13. A tree stand according to claim 12 in which each arm is mounted for movement about a second axis generally normal to said first axis whereby the arms can move inwardly.

14. A tree stand according to claim 13 in which one arm of each pair includes a flexible steel portion which will accommodate twist.

* * * * *

Dedication 4,428,459.—*Paul L. Peck*, Fond du Lac, Wis. TREE STAND. Patent dated Jan. 31, 1985. Dedication filed Mar. 11, 1984, by the assignee, *Tru Fire Corp.*

Hereby dedicates to the public the entire term of said patent.
[*Official Gazette July 23, 1985.*]